Dec. 6, 1960   J. ANDRADE ET AL   2,962,738
METHOD OF MAKING SHOES
Filed Feb. 7, 1956   2 Sheets-Sheet 1

Inventors
Jeremias Andrade
Manuel A. Sousa
by Roberts, Cushman & Grover
Attys

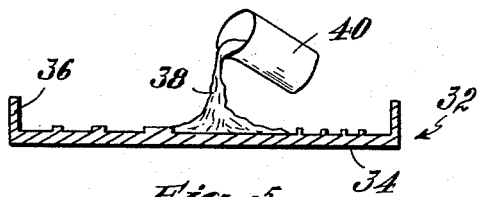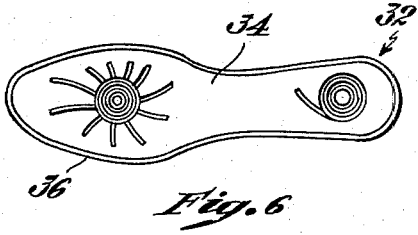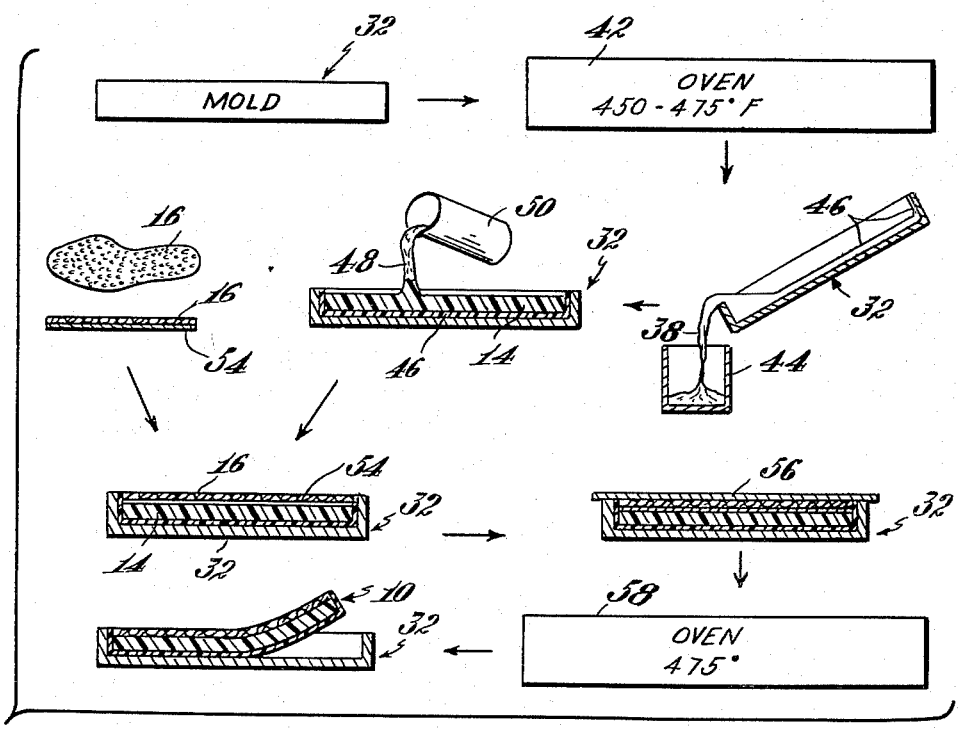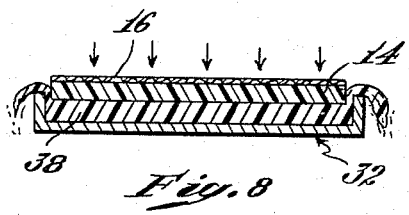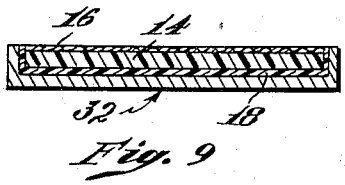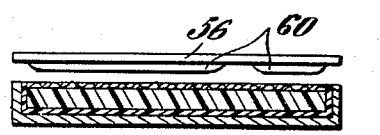

United States Patent Office 2,962,738
Patented Dec. 6, 1960

2,962,738

METHOD OF MAKING SHOES

Jeremias Andrade and Manuel A. Sousa, Bristol, R.I., assignors to Bristol Manufacturing Corporation, Bristol, R.I., a corporation of Rhode Island Filed Feb. 7, 1956, Ser. No. 563,962

2 Claims. (Cl. 12—142)

This invention relates to shoe manufacture and more especially to rubber or rubber-like outer soles for shoes and to a method of manufacturing the same.

According to the common method of making fabric shoes with rubber soles, extensively known as tennis shoes or sneakers a fabric upper is lasted over a metal last, and an unvulcanized rubber sole is assembled with the upper and the last, whereupon the assembly is placed in a vulcanizing chamber and the parts united by vulcanization. Several hours are required to effect vulcanization hence it is not possible to perform the operation with the same pair of lasts more than once or once and a half times in a working day, thus a large number of lasts are required and since they are expensive this represents a large relatively unproductive capital investment. Furthermore, since imperfections occur for the most part during vulcanization at the time of attachment of the sole to the upper the entire shoe must be rejected, if the sole is defective, as a first quality shoe even though the upper itself is perfect thus adding to the cost.

An object of the present invention is to provide a completed outer sole which may be attached to the bottom of the lasted upper in a comparatively short time so that the same lasts may be used from 5 to 10 times during the working day as compared to once and a half times a working day. Another object is to provide a completed outsole which may be attached to the bottom of the lasted upper by use of pyroxylin cement or a self-curing rubber cement while the parts are held under pressure, thereby eliminating the need for vulcanizing equipment which is expensive, reduce the life of the lasts and involves increased labor costs. Another object is to provide outsoles which are completely vulcanized prior to attachment to the upper so that defective soles may be discarded prior to attachment to the upper, thereby eliminating rejects in the finished shoe which may include a perfect upper. Still further objects are to provide a method of making outsoles in which it is possible to effect mass production on an assembly line set-up, thus further reducing cost.

According to the method a laminate having the contour and thickness of an outsole is made by combining layers of polymerizable materials having wear-resistant characteristics for the tread surface and cushioning characteristics for the bottom, together with a textile layer designed especially to provide good anchorage for bonding the outsole to the lasted upper bottom. This is accomplished by providing a shell of polymeric material, the bottom of which corresponds in shape to the sole and the wall of which corresponds in thickness to the sole and in which the interior surface is fluid and filling the shell with a polymeric material which upon polymerization provides a sponge-like layer. A fabric layer is applied to the filling material prior to polymerization thereof, the outer side of which has projecting from it a multiplicity of fibers or threads and the assembled components are then united by polymerization. According to the practice a polyvinyl chloride is used for the tread surface layer having a high abrasive index and is poured in liquid form into a mold whereupon the mold is heated long enough to gel the liquid next to the mold surface. The ungelled liquid polymer is then discharged leaving a thin shell having a bottom and walls, the interior of which is fluid. The filler may itself be in liquid form and be poured into the shell or may be precut from a sheet of partially or completely polymerized material which has yieldingly resistant sponge-like characteristics. If a precut filler is employed it is the practice to insert it into the mold after the preliminary heating and prior to pouring off the ungelled liquid polymer, thereby to effect discharge of the liquid polymer by displacement. Optionally there may be incorporated in the filler, ground or comminuted waste. The top fabric layer is preferably woven, is coated on one side with a polymeric substance for contact with the filler and has at its opposite side a multiplicity of fibers or threads which serve to improve the bond between the finished sole and the upper. The component parts are united by completing polymerization of Invention also resides in a laminated outsole comprised of a shell of polymerized polyvinyl chloride having a high index of abrasion, which provides the tread surface and the edge of the sole, a core of polymerized sponge-like material filling the shell to substantially its rim, providing a cushion layer for the foot and a fabric at the exposed surface of the core having on its exterior surface a multitude of projecting threads which provide anchorage for attaching the sole to the upper, the parts being inseparably united by polymerization.

The invention will now be described in greater detail with reference to the accompanying drawings wherein:

Fig. 5 is a diagrammatic longitudinal section through a sole mold illustrating one of the earlier steps in the process;

Fig. 6 is a view inside of the mold shown in Fig. 5, at the bottom, prior to the introduction of the plastic material;

Fig. 7 is a flow sheet illustrating successive steps in the process of making an outer sole subsequent to the step shown in Fig. 5;

Fig. 8 is a longitudinal section through a sole mold illustrating a modification of the method such as to provide a sole having a lateral wall thicker than that resultant from the process of Figs. 5 to 7;

Fig. 9 is a section similar to Fig. 8, showing a later stage in the modified process;

Figure 11:

Fig. 10 is a longitudinal section through a sole mold showing a sole contouring plate which may be used in the practice of the process of Figs. 5 to 7 or the process of Figs. 8 and 9, and which results in the preparation of a sole whose upper surface is shaped to form a matrix for the reception of the bottom of the lasted shoe; and Fig. 11 is a fragmentary section of the cushion layer showing the sponge-like construction thereof, and incorporated comminuted scrap or waste.

Figure 1:
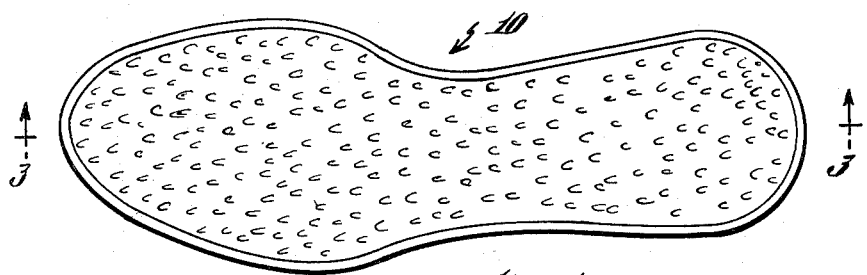
Fig. 1 is a plan view of an outer sole made in accordance with the present invention.
Figure 2:
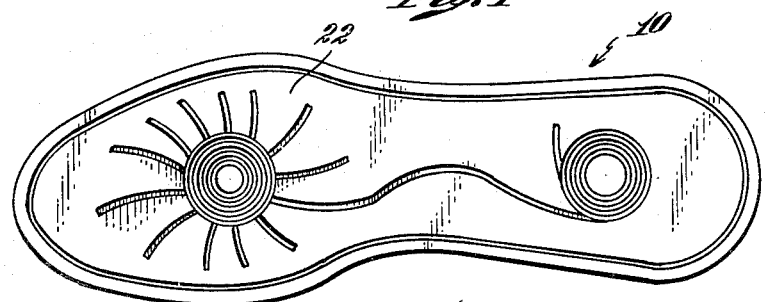
Fig. 2 is a bottom view of the sole of Fig. 1.
Figure 3:
Fig. 3 is a section substantially on the line 3—3 of Fig. 1, but omitting the patterning of the tread surface.

Referring to the drawings, Figs. 1 to 3 show a sole member 10 which is comprised of three layers of material designed to have characteristics especially suitable for their function, namely a bottom or tread layer 12 having a high index of abrasion to afford a maximum wearing surface, a cushion layer 14 adapted to yield to and conform to the bottom of the foot to afford maximum comfort and an attaching layer 16 designed to provide the maximum security of attachment between the sole and the upper material of the shoe. More specifically the bottom layer 12 is comprised of a polymeric material such as a polyvinyl chloride of very high index of abrasion and containing a thoroughly mixed plasticizing agent. This layer is in the form of a shell having a bottom 18, the thickness of which is approximately 3/16" to 1/4", and a peripheral wall 20, the thickness of which is about 0.013" and provides a continuous skin-like container which embraces the edges of the layers 14 and 16, so that only the top surface of the layer 16 is exposed, thereby excluding entrance of moisture and providing a finished edge surface which will yield under compression or tension without destruction. The bottom surface of the bottom 18 may be suitably embossed as shown at 22 (Fig. 2) to provide a pleasing pattern as well as an efficient traction surface and also if desired to include identification marking.

The term "polymeric" material is intended to include any of the plastics whether of natural or artificial origin which are capable of becoming stabilized by the application of heat. Preferably a plastisol is employed which is a polyvinyl chloride resin dispersed in a liquid plasticizer along with colorants, stabilizers, and other modifying agents; the resulting compound may be either a liquid or a paste. The most common molding plastisols are relatively low viscosity liquid compounds that are pourable for ease of handling, and it is such a liquid compound which is used herein. Such plastisols are considered as 100% solids materials; therefore, there are no solvents or diluents to be evaporated and cause shrinkage problems. The plastisol is converted to an elastomeric compound by raising its temperature to 350 to 475° F. and at the aforesaid temperature the conversion or fusion is about instantaneous.

The cushion layer 14 is a body of polymeric material which has the yieldably resilient spring-like characteristics of a sponge. Preferably this material is also a polyvinyl chloride but contains a quantity of comminuted scrap. Up to 50% scrap may be used to advantage thereby lowering cost without deleteriously affecting its usefulness. Such scraps may be in the form of waste upper material ground up, waste soles which have for one reason or another been discarded because of defect in manufacture or any other scrap consisting of fabric, leather or rubber employed in the manufacture of shoes. Plastisol compounded to produce a vinyl sponge or foam is now commercially available and is used herein in mixture with scrap.

The top layer 16 is preferable a woven fabric having on its upper side a multiplicity of threads or fibers 24 which may be in the form of a nap, a pile or projecting loops of threads such as terry cloth. In the preferred form the layer 16 is a piece of terry cloth and its loops provide excellent means for improving the bond between the sole and the upper.

Figure 4:
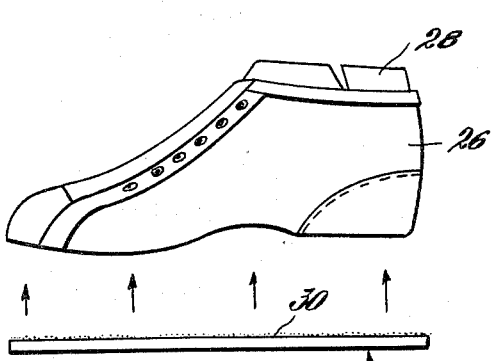
Fig. 4 is a composite view showing a lasted shoe upper and an outer sole made according to the present invention arranged in readiness for assembly.
Figure 4A:
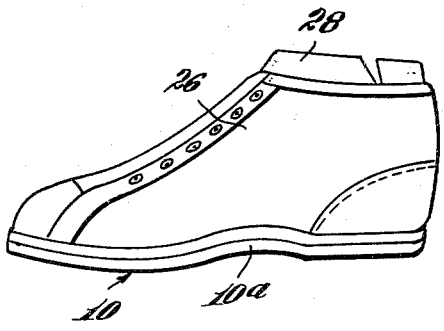
Fig. 4a is a view generally similar to Fig. 4, but showing the outer sole as assembled with and united to the lasted upper.

The completed outsole member 10 is applied to the bottom of the upper 26 (Fig. 4) which has been previously drawn onto a metal, wood or plastic last 28 by first coating the top surface of the layer 16 of the sole member with a layer of pyroxlin cement or a self-curing rubber cement 30, assembling the parts as shown in Fig. 4 so that the coated surface of the outsole and bottom of the upper are in registration and then bringing the parts together under pressure and holding them under pressure until the cement sets or cures as the case may be. After attachment of the outsole a foxing strip 10a may be applied, as shown in Fig. 4a. The operation of assembling the outer sole with the upper can be accomplished in a period of the order of twenty (20) minutes. Thus the same last may be used from 5 to 10 times during the working day as contrasted to prior methods wherein the sole was vulcanized to the upper on the last. Furthermore, no vulcanizing equipment is required; the lasts are not subjected to vulcanizing heat and hence have a longer life; the labor costs are reduced materially, and since it is possible to make lasted uppers which are perfect to a very high percentage, and since defects in the outsole can be checked before assembly with the upper, the cost from rejects is very much reduced. Moreover, it is apparent that making the uppers and outsole separately makes possible mass production and assembly line set-up for further cost reduction.

The method followed in manufacture of the outsole consists in bringing the three layers together under conditions of partial polymerization and then permanently uniting them by completing polymerization, as will now be described.

A mold 32 is used in making the bottom layer 12, which mold is shown in Figs. 5 and 6 as having a comparatively thick bottom wall 34, the inner surface of which is relieved to give the desired pattern 22 wanted on the tread surface of the sole and an upstanding peripheral wall 36, the height of which corresponds substantially to the thickness of the sole which is to be produced. The bottom is, of course, shaped to correspond to the configuration of the sole bottom and the wall to the edge of the sole. Liquid polymeric material 38 having a high abrasive index mixed with a suitable plasticizer is poured for example from a container 40 into the mold until the mold is substantially filled. The polymer used herein is known as "plastisol" because among other desirable characteristics it takes the sharp impression of the mold because it does not shrink like rubber in curing. The plastisol is poured into the mold as gently as possible, that is to avoid foaming and inclusion of air by the violence of its escape from the container into the mold. Furthermore, the mold is vibrated in any suitable way but without too much violence to aid in eliminating bubbles and trapped air. After the mold is completely filled it may be allowed to set for a period of from 1 to 1 and 1/2 minutes to allow included air in the form of bubbles to rise and escape. Referring to the flow sheet (Fig. 7), the mold is then placed in an oven 42 and heated therein at a temperature in the order of 450 to 475° F. for approximately three minutes. At this temperature and for the duration prescribed the polymeric material next to the walls of the mold gels but that inwardly of the walls remains liquid. The mold is withdrawn from the oven and the liquid polymeric material is discharged from the mold by tilting it upwardly and pouring it out into a receptacle 44 for reuse. When the plastisol is poured out there remains in the mold a layer of material 46, the inner surface of which is still fluid. The bottom is substantially thicker than the walls because of greater heating at the bottom and the tendency of the liquid to gravitate from the walls to the bottom when the mold is emptied. The mold emptied except for the layer 46 is allowed to cool whereupon the coating at the bottom is leveled as much as possible by gently tilting the mold in first one direction and then the other.

The sponge layer 14 is now introduced in the form of a liquid polymer 48 and is poured from a receptacle 50 into the previously formed shell up to substantially the level of the mold leaving just enough room above it and the rim of the mold for the top layer. As previously stated the filler is plastisol compounded to produce a sponge or foam and is mixed with scrap 52 (Fig. 11) such as upper material and bottom material which has been discarded and ground up. Up to approximately 50% scrap may be used with substantial economy and without deleteriously affecting the quality of the layer.

The top layer 16 precut from a suitable fabric such as terry cloth is now coated on one side with a layer of liquid polymer 54 and placed on top of the filling layer 14. Terry cloth is preferred because it has a multiplicity of loops on its exposed surface which provide anchorage for attaching the sole to the upper. Other fabrics, however, may be used such as those having a nap or pile surface or even a fabric having a coarse weave which will take up a quantity of adhesive. A metal plate 56 is placed on top of the textile layer and the closed mold is placed in an oven 58 for heating at a temperature of 450 to 475° F. for a period of seven to eight minutes, whereupon the mold is removed, allowed to cool and the sole stripped from the mold. Cooling is effected after the mold is withdrawn from the oven by immersing the mold in water or some other means to shorten the cooling time. The final heating effects complete polymerization of the polymeric material so that a permanent union is created between the component parts.

If greater wall thickness is desired, for example in the order of ⅛ or ¼ inch an alternative method is practiced as shown in Figs. 8 and 9. As there shown the cushion layer 14 may be precast in sheet form and cut up into properly shaped sections, smaller in area than the mold by the amount of the desired wall thickness and from sheet material of less thickness than the depth of the mold by the amount of the bottom thickness desired. This precut filler piece is then placed on the surface of the liquid plastisol after the mold is withdrawn from the oven 42 at the end of the preliminary heating and gelling of the plastisol next to the bottom and walls without pouring off the polymer (Fig. 8) whereupon the filler is pressed down into the mold so as to discharge some of the non-gelled plastisol by displacement thereof. By this method walls of predetermined thickness can be obtained. The textile layer 16 may be applied to the cushion layer 14 prior to or after the latter is placed in the mold. After discharging the plastisol the mold is placed in an oven as previously explained to effect complete polymerization and union of the component parts to provide a composite sole member.

During the final baking operation, in the practice of either method, the upper surface of the cushion layer and the fabric layer may be contoured to complement the bottom of the last and this is accomplished, as illustrated in Fig. 10, by providing at the underside of the metal plate 56, which is placed on top of the last, a relief 60 which will make the desired impression. Thus, the finished sole will fit snugly against the bottom of the lasted upper and insure uniform adhesion over the entire surface.

It should be understood that the present disclosure is for the purpose of illustration only and that this invention includes all modifications and equivalents which fall within the scope of the appended claims.

We claim:

1. The method of making shoes which comprises providing an open-top outersole mold of a shape and depth corresponding to the configuration of the desired outersole, gelling a shell of vinyl plastisol on the bottom and side wall of said mold, filling said shell cavity with polymeric sponge material, providing on the outer surface of said sponge material a fabric layer having a multiplicity of projecting threads on its outer surface, subjecting the superposed layers to heat to fuse said shell and unite the parts to form an outersole, removing the outersole from the mold, and adhering the outersole to a lasted upper having an insole substantially coextensive with the outersole.

2. The method of making shoes which comprises providing an open-top outersole mold of a shape and depth corresponding to the configuration of the desired outersole, filling the mold with liquid vinyl plastisol, gelling a shell of plastisol on the bottom and side wall of said mold, said shell being filled with ungelled plastisol, pressing a pre-cut, expanded sponge filler into said shell thereby displacing ungelled plastisol, providing on the outer surface of said sponge material a fabric layer having a multiplicity of projecting threads on its outer surface, subjecting the superposed layers to heat to fuse said shell and unite the parts to form an outersole, removing the outersole from the mold and adhering the outersole to a lasted upper having an insole substantially coextensive with the outersole.

References Cited in the file of this patent

UNITED STATES PATENTS

| | | |
|---|---|---|
| 1,936,729 | Mebane | Nov. 28, 1933 |
| 2,106,840 | Gould | Feb. 1, 1938 |
| 2,121,678 | Armor | June 21, 1938 |
| 2,304,717 | Swart | Dec. 8, 1942 |
| 2,382,784 | Emery | Aug. 14, 1945 |
| 2,444,978 | Cooke | July 13, 1948 |
| 2,445,732 | Carter | July 20, 1948 |
| 2,629,698 | Sterling | Feb. 24, 1953 |
| 2,663,097 | Giese | Dec. 22, 1953 |
| 2,694,871 | Rollman | Nov. 23, 1954 |
| 2,744,340 | Gerber | May 8, 1956 |
| 2,753,642 | Sullivan | July 10, 1956 |
| 2,772,194 | Fisher et al. | Nov. 27, 1956 |
| 2,785,440 | Toulmin | Mar. 19, 1957 |
| 2,787,809 | Stastny | Apr. 9, 1957 |
| 2,880,467 | Wibbens | Apr. 7, 1959 |

FOREIGN PATENTS

| | | |
|---|---|---|
| 406,697 | Great Britain | Feb. 26, 1934 |
| 156,033 | Australia | Apr. 8, 1954 |